United States Patent [19]

Endo

[11] Patent Number: 4,599,714
[45] Date of Patent: Jul. 8, 1986

[54] PHOTO-MAGNETIC REPRODUCING APPARATUS

[75] Inventor: Kiyonobu Endo, Yokohama, Japan

[73] Assignee: Canon Kabushiki Kaisha, Tokyo, Japan

[21] Appl. No.: 494,869

[22] Filed: May 16, 1983

[30] Foreign Application Priority Data

May 21, 1982 [JP] Japan .................. 57-86330

[51] Int. Cl.⁴ .............................................. G11B 7/00
[52] U.S. Cl. .................................... 369/13; 360/114; 369/110
[58] Field of Search .................... 360/114; 369/13, 44, 369/45, 107, 110; 365/122

[56] References Cited

U.S. PATENT DOCUMENTS 4,451,863  5/1984  Kato .................. 369/45 X

FOREIGN PATENT DOCUMENTS 55-25881  2/1980  Japan .................. 360/114

OTHER PUBLICATIONS

IBM Technical Disclosure Bulletin, vol. 19, #4, Sep. 1976.

Primary Examiner—Robert L. Richardson
Attorney, Agent, or Firm—Fitzpatrick, Cella, Harper & Scinto

[57] ABSTRACT

Disclosed is a photo-magnetic reproducing apparatus in which an incident light beam polarized in a predetermined direction enters a recording medium on which information is magnetically recorded. The light beam from the recording medium is split into two light beams, and a signal containing the information therein is detected from one of the split light beams, while a signal not containing the information therein is detected from the other of the split light beams. The detected two signals are differentiated to thereby obtain an information reproducing signal.

3 Claims, 13 Drawing Figures

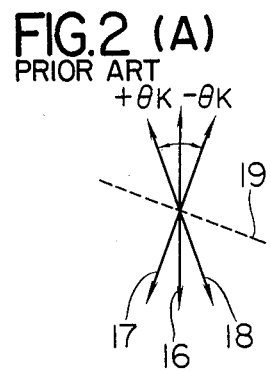
FIG.2 (A) PRIOR ART
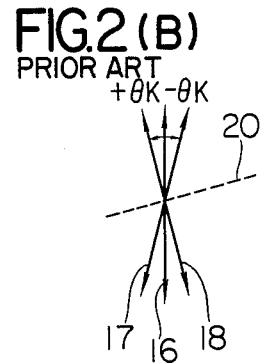
FIG.2 (B) PRIOR ART
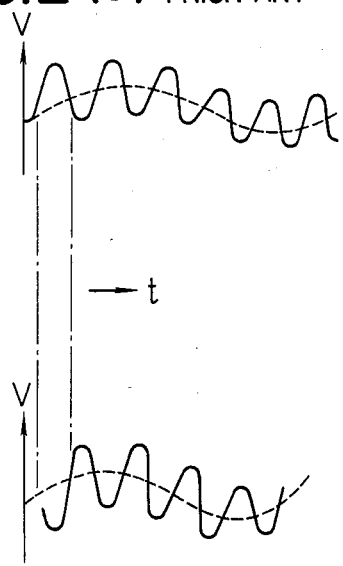
FIG.2 (C) PRIOR ART
FIG.2 (D) PRIOR ART
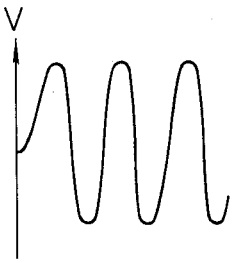
FIG.2 (E) PRIOR ART

PHOTO-MAGNETIC REPRODUCING APPARATUS

BACKGROUND OF THE INVENTION

1. Field of the Invention

This invention relates to a signal reproducing apparatus for optically reproducing signals recorded on a magnetic recording medium.

2. Description of the Prior Art

Recently, apparatuses for optically reproducing magnetically recorded information by utilization of a vertical magnetic recording medium have been developed. In such apparatuses, reproduction of the information is accomplished by causing a polarized light to enter the recording medium, causing the light beam having its plane of polarization rotated by the Kerr effect or the Farady effect to pass through an analyzer and detecting the light beam by a photodetector. An example of such photomagnetic information reproducing apparatus according to the prior art is shown in FIG. 1 of the accompanying drawings.

In FIG. 1, reference numeral 1 designates a recording medium comprising a photo-magnetic material such as MnBi, TbFeO$_3$, GdIG, DgCO, GdFe, TbFe, GdTbFe or TbDyFe deposited on a substrate of glass or plastics by vapor deposition or sputtering. The recording medium has information recorded thereon by variations in the direction of magnetization (upward direction or downward direction) and is rotated by a motor 2.

A light emitted from a light source 3 such as a semiconductor laser is collimated into a parallel light beam by a collimater lens 4. A polarizer 5 makes the light beam into a linearly polarized light and causes it to enter the recording medium 1. Designated by 6 is a beam splitter for separating the incident light and the reflected light from the recording medium. The incident light beam is made into a minute spot by a condenser lens 7 and impinges on the recording medium 1, and is reflected with the plane of polarization thereof rotated through $\theta k$ or $-\theta k$ by the Kerr effect in correspondence with the direction of magnetization of the recording medium. This reflected light is reflected by the beam splitter 6 and split into two directions by a half-mirror 8. The split light beams respectively pass through analyzers 9 and 10 and condenser lenses 11 and 12 and are directed to photo-detectors 13 and 14, whereby they are are converted to electrical signals.

Such two electrical signals are differentiated by a differential amplifier 15 and utilized as an information reproducing signal.

The reproducing signal is obtained by the differential detection method, which will hereinafter be described in detail by reference to FIGS. 2(A), (B), (C), (D) and (E) of the accompanying drawings.

FIGS. 2(A) and (B) illustrate the directions of the transmission axes of the analyzers 9 and 10. In these Figures, reference numeral 16 designates the direction of the plane of polarization of the light beam entering the recording medium, and reference numerals 17 and 18 denote the planes of polarization of the reflected light beams rotated through $-\theta k$ and $+\theta k$, respectively, by the direction of magnetization of the recording medium.

Now, the transmission axis of the analyzer 9 in FIG. 1 is disposed perpendicularly to the plane of polarization 17 when rotated through $-\theta k$, as shown at 19 in FIG. 2(A). On the other hand, the transmission axis of the analyzer 10 of FIG. 1 is disposed perpendicularly to the plane of polarization 18 rotated through $+\theta k$, as shown at 20 in FIG. 2(B).

By such an arrangement, the electrical signals obtained from photodetectors 13 and 14 in FIG. 1 become signals which are 180° out of plase with each other (that is, which have been inverted from negative to positive). Usually, the recording medium has an irregular reflection factor, pin-holes, dust, etc. and the noise component resulting therefrom is likewise detected by the detectors 13 and 14 irrespective of the presence of the analyzer. For example, where the recording medium has an irregular reflection factor, the signal waveform undulates due to the noise component as indicated by broken line in FIG. 2(C) or (D). In the prior art example shown in FIG. 1, the differential between the detection signals shown in FIGS. 2(C) and (D) is taken, whereby the noise components which are of the same phase are offset and the information signals are in an added form. Thus, the final reproducing signal is obtained as shown in FIG. 2(E) and accordingly, the S/N ratio of information reproduction is improved.

However, in the conventional photo-magnetic reproducing apparatus as described above, the angle of rotation of the plane of polarization is very small and therefore, in order that the polarized component having information may be separated from the modulated light beam, two expensive analyzers having a very high analyzing performance must be aligned and arranged with high accuracy, and this has led to cumbersome adjustment and high cost.

Also, for efficient information reproduction, the incident light must be properly spotted on the recording medium, and in the photo-magnetic reproducing apparatus as described above, focus control has been accomplished by the use of a well-known focusing method and by a mechanism, not shown, in accordance with the control signal from the detector 13 or 14. However, the light beams received by the detectors 13 and 14 have passed through the analyzers 9 and 10, respectively. The analyzers decrease the quantity of light passed therethrough, and this has led to the disadvantage that focus control of high accuracy cannot be achieved.

SUMMARY OF THE INVENTION

It is an object of the present invention to realize a photo-magnetic reproducing apparatus capable of accomplishing information reproduction with a high S/N ratio, at a low cost.

It is a further object of the present invention to provide a photo-magnetic reproducing apparatus in which focus control of high accuracy is possible.

The above objects of the present invention are achieved by a photo-magnetic information reproducing apparatus which comprises means for causing an incident light beam polarized in a predetermined direction to enter a recording medium on which information is magnetically recorded, light beam splitting means for splitting the light beam from the recording medium into two light beams, first detecting means for obtaining a signal containing the information therein from one of the split light beams, second detecting means for obtaining a signal not containing the information therein from the other of the split light beams, and means for differentiating the signals from the first and second detecting means to thereby obtain an information reproducing signal.

The invention will become more fully apparent from the following detailed description thereof taken in conjunction with the accompanying drawings.

BRIEF DESCRIPTION OF THE DRAWINGS

FIGS. 2(A) and (B) illustrate the directions of the transmission axes of analyzers in the photo-magnetic information reproducing apparatus according to the prior art.

FIGS. 2(C), (D) and (E) show signals detected in the photo-magnetic information reproducing apparatus according to the prior art.

DESCRIPTION OF THE PREFERRED EMBODIMENTS

Figure 3:
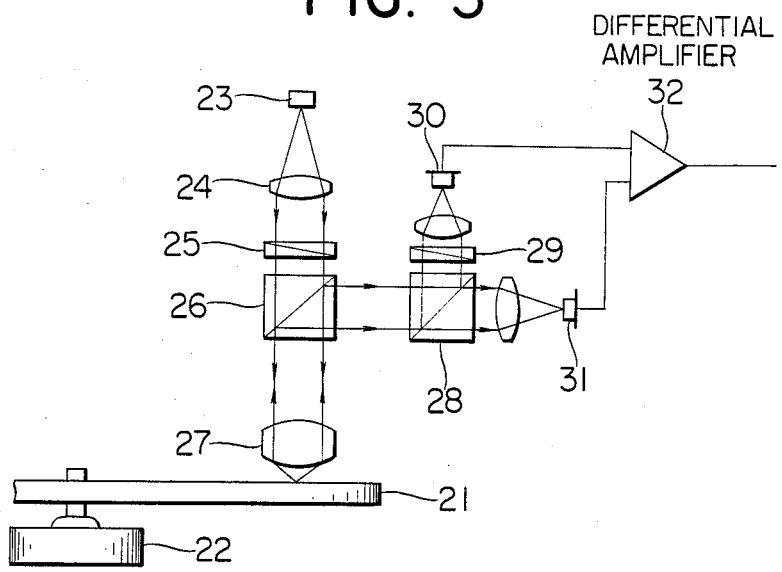
FIG. 3 schematically shows an embodiment of the photo-magnetic information reproducing apparatus of the present invention.

FIG. 3 shows a first embodiment of the photo-magnetic information reproducing apparatus of the present invention.

A light source 23 such as a semiconductor laser is continuously turned on, and a light beam emitted from the light source 23 is collimated into a parallel light beam by a collimater lens 24. Designated by 25 is a polarizer disposed to cause the light beam to illuminate a recording medium as a linearly polarized light beam. The polarizer 25 will not be necessary if the light beam emitted from the light source 23 is a linearly polarized light. Denoted by 26 is a first beam splitter such as a half-mirror.

Reference numeral 27 designates a condenser lens for making the light beam into a minute spot which illuminates a photo-magnetic recording medium 21 rotated by a motor 22. Information is pre-recorded on the photo-magnetic recording medium 21 by a variation in the direction of magnetization.

The light beam reflected by the recording medium 21 is reflected while being rotated to a plane of deflection of $\theta k$ or $-\theta k$ depending on the direction of magnetization of the recording medium. This reflected light is separated from the incident light beam by the first beam splitter 26 and is further split into two light beams by a second beam splitter 28.

One of the reflected lights split by the beam splitter 28 is passed through an analyzer 29 and received by a photodetector 30, and the recorded pattern indicated by the direction of magnetization of the recording medium is converted to an information signal.

Figure 4:
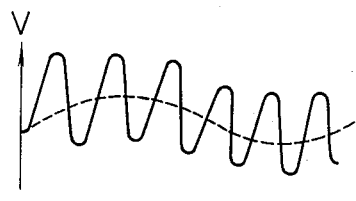
FIGS. 4(A), (B) and (C) show signals detected in the photo-magnetic information reproducing apparatus of the present invention.
Figure 4:
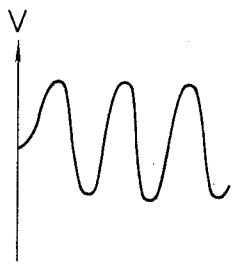
Figure 4:
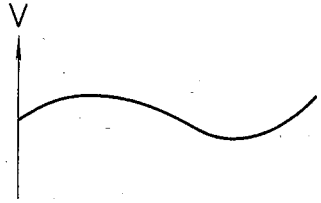

Usually, undulation resulting from the irregularity of the reflection factor on the surface of the recording medium as indicated by a broken line in FIG. 4(A) or spike-like noise resulting from dust, flaws or pin-holes is superposed on such an information signal. On the other hand, the light beam transmitted through the beam splitter 28 is not passed through an analyzer but is directly detected as an electrical signal by a photodetector 31. This signal does not contain a magnetized pattern signal as shown in FIG. 4(B) but only a noise component is obtained. These electrical signals are differentially detected by a differential amplifier 32, whereby a reproduce signal in which the noise component has been offset as shown in FIG. 4(C) can be produced.

Figure 1:
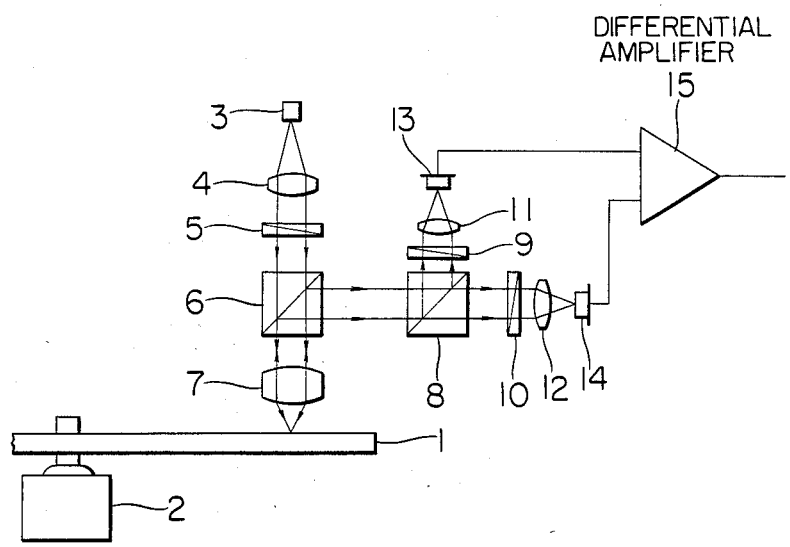
FIG. 1 schematically shows the construction of a photo-magnetic information reproducing apparatus according to the prior art.

In the above-described photo-magnetic reproducing apparatus, only one analyzer is used and therefore, the apparatus can be constructed inexpensively and the labor required for the position adjustment of the analyzer is one-half of that required in the prior art device of FIG. 1. The light beam received by the photodetector 31 is not passed through an analyzer and therefore receives a sufficient quantity of light. By obtaining a focus signal from the photodetector 31 side in a known manner, focus control of high accuracy can be accomplished.

In the previously described embodiment, a beam splitter having a polarizing characteristic is employed as the beam splitter 28, whereby the S/N ratio of the information reproducing signal can be further improved.

An embodiment in which the beam splitter 28 in FIG. 3 is a polarizing beam splitter having a characteristic that the transmitted component is great (say, 90% or more) relative to the direction of polarization of the incident light beam onto the recording medium and having a characteristic that the reflected component is great (say, 90% or more) relative to the direction of polarization perpendicular to the direction of polarization of the incident light beam is a second embodiment of the present invention.

Variations in the angle of rotation of the plane of polarization in the second embodiment will now be described by reference to FIGS. 5(A), (B) and (C). The light beam entering the recording medium 21 is shown as P-polarized light indicated by a in FIG. 5(A). The reflected light from the recording medium 21 becomes an elliptically polarized light whose major axis has been rotated through $\theta k$ relative to the original plane of deflection by the Kerr effect, and the direction of this major axis is indicated by b in FIG. 5(A). That is, this plane of polarization is represented by (P component) $\cos \theta k$ and (S component) $\sin \theta k$.

In FIG. 3, assuming that the beam splitter 26 has no polarizing characteristic for simplicity of illustration, the Kerr angle of rotation $\theta k$ of the reflected light is varied by the polarizing characteristic of the second beam splitter 28.

Assuming that the reflection factor of the beam splitter 28 is Rp for P-polarized light and Rs for S-polarized light, the P and S components of the plane of polarization of the light beam reflected by the beam splitter 28 are $Rp \cos \theta k$ and $Rs \sin \theta k$, respectively, and the angle of rotation $\phi k$ of the plane of polarization is $$\phi k = \tan^{-1} (Rs/Rp \tan \theta k) \qquad (1)$$

Accordingly, if $Rs/Rp=1$, $\phi k=\theta k$, if $Rs/Rp>1$, $\phi k>\theta k$,
and if $Rs/Rp<1$, $\phi k<\theta k$. That is, if $Rs/Rp>1$ is set, the light reflected by the beam splitter 28 has the angle of rotation of the plane of polarization thereof substantially enlarged as shown by c in FIG. 5(B).

Figure 5:
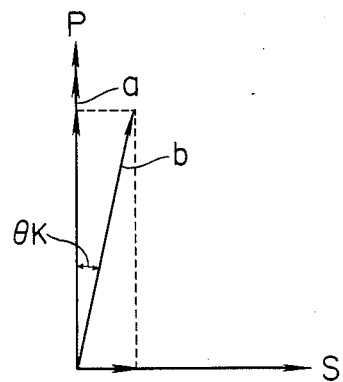
FIGS. 5(A), (B) and (C) illustrate variations in the angle of rotation of the plane of polarization of the detected light when a polarizing beam splitter is used as light beam splitting means.
Figure 5:
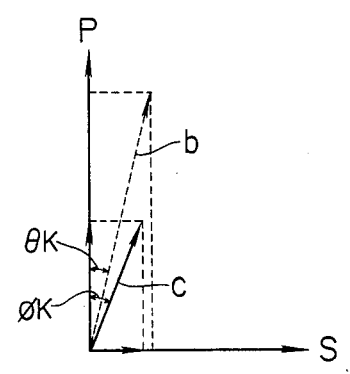
Figure 5:
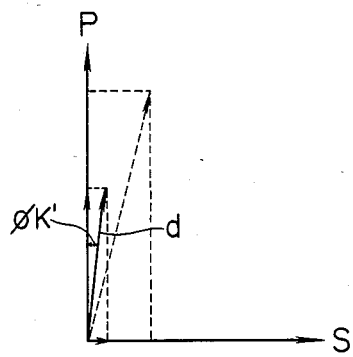

In FIG. 5(C), d shows the plane of polarization of the light transmitted through the beam splitter 28 and, assuming that the transmission factor of P-polarized light is Tp and the transmission factor of S-polarized light is Ts, the angle of rotation $\phi k'$ is $$\phi k' = \tan^{-1}(Ts/Tp \tan \theta k) \quad (2).$$

Generally, $Ts = 1 - Rs$ and $Tp = 1 - Rp$ and in the present embodiment, $Rs/Rp > 1$ and hence, $Ts/Tp < 1$ and $\phi k' < \theta k$.

Usually, the S/N ratio of a information reproducing signal is proportional to the magnitude of the angle of rotation of the plane of polarization and therefore, in the present embodiment, as previously described, the reflected light beam having the angle of rotation of the plane of polarization thereof increased is passed through the analyzer 29 and the magnetized pattern on the recording medium is converted into a light-and-dark pattern of sharp contrast and is taken out as a reproduce signal of high S/N ratio by the photodetector 30. Also, the light beam transmitted through the beam splitter 28 has the angle of rotation of the plane of polarization thereof decreased, but in the present embodiment, such transmitted light beam is used for the noise signal detection and therefore, the S/N ratio of the reproduce signal obtained from the differential amplifier 15 is hardly decreased as compared with that in the prior art example of FIG. 1. Again in the present embodiment, the quantity of light reaching the photodetector 31 is great and therefore, it is desirable that the focus control signal be obtained from the photodetector 31 side.

In the previously described embodiment, an information signal is detected from the light reflected by the beam splitter and a noise signal is detected from the light transmitted through the beam splitter, but design may also be made such that the information signal is obtained from the transmitted light and the noise signal from the reflected light. Where a polarizing beam splitter is used as the beam splitting means, the polarizing characteristic thereof must be set so that the angle of rotation of the plane of polarization of the transmitted light is increased.

Also, the present embodiment has been shown with respect to a case where the Kerr effect of detecting the reflected light from the recording medium is utilized, but the present invention is also usable in case the signal is reproduced from the light transmitted through the recording medium by utilization of the Farady effect.

What I claim is:

1. A photo-magnetic information reproducing apparatus comprising:

means for causing a light beam polarized in a predetermined direction to be incident on a recording medium on which information is magnetically recorded;

an analyzer;

first detecting means positioned for receiving a part of the light beam transmitted from the recording medium through said analyzer, the polarized condition of the light beam being modulated according to the information recorded on the recording medium, said first detecting means further photoelectrically converting said part of the light beam to obtain a first detected signal;

second detecting means positioned for receiving the remaining part of the light beam transmitted from the recording medium without passing through said analyzer, said second detecting means photoelectrically converting said remaining part of the light beam to obtain a second detected signal; and means for differentiating said first and second detected signals obtained by said first and second detecting means respectively thereby to obtain an information reproducing signal representing said information recorded on the recording medium.

2. A photo-magnetic information reproducing apparatus according to claim 1, further comprising light beam splitting means for splitting the light beam transmitted from said recording medium to direct said part thereof and said remaining part thereof to said first and second detecting means, respectively.

3. A photo-magnetic reproducing apparatus according to claim 2, wherein said light beam splitting means is a polarizing beam splitter having the characteristic of relatively increasing the polarization component, of the light beam travelling toward said first detecting means, which is in a direction perpendicular to said predetermined direction, as compared with the polarization component which is in said predetermined direction.

* * * * *

UNITED STATES PATENT AND TRADEMARK OFFICE
CERTIFICATE OF CORRECTION

PATENT NO. : 4,599,714

DATED : July 8, 1986

INVENTOR(S) : KIYONOBU ENDO

It is certified that error appears in the above-identified patent and that said Letters Patent is hereby corrected as shown below:

Column 2, line 6, change "plase" to --phase--.

Column 5, line 15, change "reproduce" to --information reproducing--;

line 21, change "reproduce" to --information reproducing--.

Signed and Sealed this

Tenth Day of March, 1987

Attest:

DONALD J. QUIGG

Attesting Officer

Commissioner of Patents and Trademarks